No. 791,639. Patented June 6, 1905.

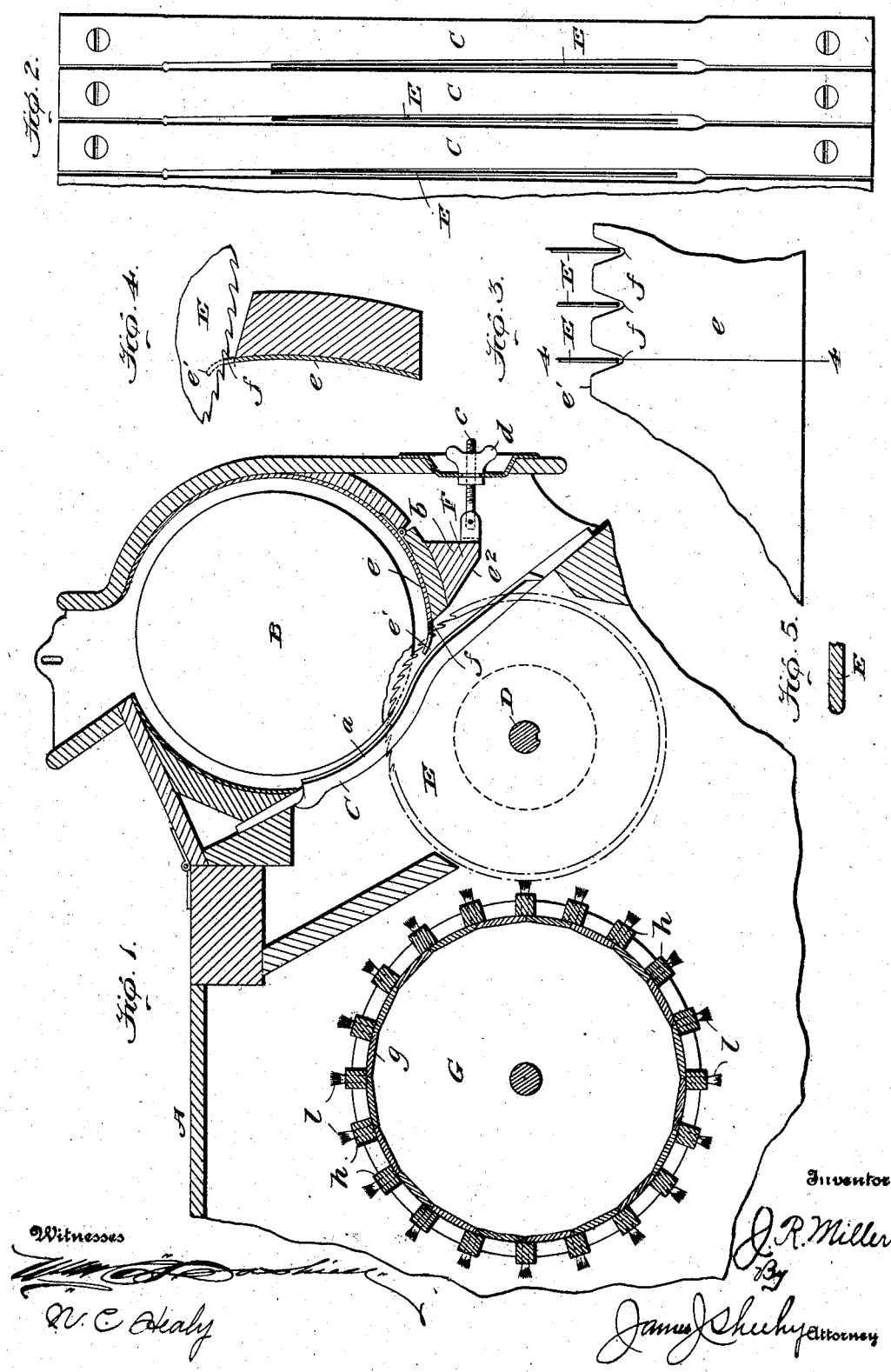

UNITED STATES PATENT OFFICE.

JACOB ROSIN MILLER, OF ATLANTA, GEORGIA.

SAW COTTON-GIN.

SPECIFICATION forming part of Letters Patent No. 791,639, dated June 6, 1905.

Application filed November 26, 1904. Serial No. 234,384.

*To all whom it may concern:*

Be it known that I, JACOB ROSIN MILLER, a citizen of the United States, residing at Atlanta, in the county of Fulton and State of Georgia, have invented new and useful Improvements in Saw Cotton-Gins, of which the following is a specification.

My invention pertains to saw cotton-gins; and it contemplates the provision of a saw-gin in which the several parts are so constructed and relatively arranged that the gin is possessed of high capacity in ginning "Sea Island" cotton and yet is not liable to tear or otherwise deteriorate the staple.

With the foregoing in mind the invention will be fully understood from the following description and claims when taken in connection with the accompanying drawings, forming part of this specification, in which—

Figure 1 is a longitudinal vertical section of so much of a saw cotton-gin as is necessary to illustrate the present and preferred embodiment of my invention. Fig. 2 is an enlarged detail front elevation illustrating the arrangement of the ribs of the gin relative to the saws. Fig. 3 is an enlarged detail section taken through the saws in a plane slightly above the notched plate of the seed-board, and Fig. 4 is a detail section taken at right angles to Fig. 3 and in the plane indicated by the line 4 4 of the latter figure. Fig. 5 is an enlarged detail section taken through the forward active edge of one tooth of one of the saws comprised in my novel gin.

Similar letters designate corresponding parts in all of the views of the drawings, referring to which—

A is the casing of my novel gin, which in general may be of any construction compatible with the purposes of my invention, and B is a roll-box disposed in the forward upper portion of the casing. The said roll-box is peculiar in that in cross-section it more completely describes a circle than the roll-boxes extant.

C C are ribs fixed in the casing and having portions $a$ curved in conformity to the roll-box for a purpose presently set forth and also having the spaces between them arranged about one inch from center to center.

D is a transverse shaft suitably mounted in the casing. E E are saws mounted on the said shaft and arranged a distance apart corresponding to the width of the ribs C, and F is a seed-board hereinafter referred to. The teeth of the saws E are punched or otherwise formed in a manner that does not entail filing, and as will be readily observed by reference to Fig. 4 the forward active edges of the said teeth are round or convex, Fig. 5, this with a view of preventing the said teeth from injuring the staple of Sea Island cotton without detracting from the ginning efficiency of the teeth. The saws E are preferably of English steel, and after their teeth are punched said teeth are finished with sand and emery, so as to render the throats and front edges of the teeth, as well as the points thereof, smooth. The seed-board F is made up of a body $b$, preferably of wood, which is hinged to the lower end of the front wall of the roll-box and is designed to be adjusted and adjustably fixed through the medium of a threaded bolt $c$ and a wing or other suitable nut $d$, mounted on said bolt, and a curvilinear plate $e$, mounted on the upper side of the said body $b$ and forming a continuation of the lining of the roll-box. The curvature of the plate $e$ is similar to that of the wall of the roll-box B in cross-section, and in the free edge of the said plate, which is turned slightly upward, as indicated by $e'$, are provided notches $f$, which receive the toothed perimeters of the saws E and are tapered or gradually diminished in width from their mouths to their inner ends, as best shown in Fig. 3.

G is the brush-roller of the gin, which is arranged, as shown in Fig. 1, relative to the saws E—*i. e.*, so that the extremities of its brushes slightly engage the toothed portions of the saws. The said roller comprises by preference a cylindrical body $g$ and twenty equidistant longitudinal sticks $h$, the said sticks being about one and one-fourth inches wide and being provided with brushes $l$, which latter may be formed of the ordinary material or any other material suitable to ginning purposes.

In virtue of the construction and relative arrangement of the roll-box, the curved portions $a$ of the ribs C, and the curved plate $e$ of the seed-board it will be observed that the throat of the gin is rendered round in cross-section, and hence contributes to the preservation of the staple of Sea Island cotton, which is very fine and amenable to damage. It will also be observed that in virtue of the beveled end $e^2$ of the body $b$ of the seed-board the teeth of the saws extend close to the inner ends of the notches $f$ in the plate $e$ at the throat, with the result that the seeds will not escape before they are thoroughly cleaned. It will be noticed, however, that the beveled end of the body $b$ and the tapered notches $f$ will permit of free escape of the seeds subsequent to the cleaning thereof. The upturned free edge $e'$ of the seed-board plate $e$ assists in preventing seeds from escaping before the same are thoroughly cleaned and also assists the gin in carrying the roll, inasmuch as it contributes to starting the roll up along the ribs. All of these features contribute to the preservation of the fiber of cotton, and hence it follows that my novel gin is especially adapted to gin Sea Island cotton, the staple of which is long and fine, and is possessed of high capacity when put to such use.

Notwithstanding the adaptability of my novel saw-gin to gin Sea Island and other long-staple cotton without injury to the staple it will be noticed that the said gin is simple and inexpensive in construction and embodies no delicate parts such as are likely to get out of order after a short period of use.

I have specifically described the construction and relative arrangement of the parts comprised in the present and preferred embodiment of my invention in order to impart a full, clear, and exact understanding of the said embodiment. I do not desire, however, to be understood as confining myself to such specific construction and relative arrangement of parts, as such changes or modifications may be made in practice as fairly fall within the scope of my invention as claimed.

Having described my invention, what I claim, and desire to secure by Letters Patent, is—

1. In a saw cotton-gin, the combination of a roll-box of circular form in cross-section, ribs disposed at the bottom of said box, and curved in conformity to the same, saws extending between the ribs and into the lower portion of the box and having teeth on their perimeters, the forward, active edges of which are round and smooth, and a seed-plate disposed at the lower end of the forward wall of the roll-box and curved in conformity to said wall and having notches in its free edge receiving the toothed perimeters of the saws; the said notches being tapered or gradually reduced in width from their mouths to their inner ends.

2. In a saw cotton-gin, the combination of a roll-box of circular form in cross-section, ribs disposed at the bottom of said box and curved in conformity to the same, saws extending between the ribs and into the lower portion of the box and having teeth on their perimeters, the forward, active edges of which are round and smooth, a seed-board comprising a body hinged to the lower edge of the front wall of the box, and beveled at its free end, and a plate arranged on said board and curved in conformity to said wall and having a slightly-upturned free edge, and also having notches in said edge receiving the toothed perimeters of the saws and tapered or gradually diminished in width from their mouths to their inner ends, and means for adjusting and adjustably fixing the said seed-board.

3. The herein-described saw cotton-gin comprising a roll-box of circular form in cross-section having its mouth disposed in its vertical center, wide ribs disposed at the bottom of the said box and curved in conformity to the same, a roller having a plurality of brush-sticks on its perimeter, saws arranged to be lightly engaged by the bristles of the brush-sticks, and disposed between the roller and the roll-box and extending between the ribs and into the lower portion of said box and having teeth on their perimeters the forward active edges of which are round and smooth, and a seed-plate disposed at the lower end of the forward wall of the roll-box and curved in conformity to said wall, and having its free edge slightly upturned and also having notches in said free edge receiving the toothed perimeters of the saws and tapered from their mouths to their inner ends.

In testimony whereof I have hereunto set my hand in presence of two subscribing witnesses.

JACOB ROSIN MILLER.

Witnesses:
  CHAS. G. MONTGOMERY, Jr.,
  G. W. DOOLEY.